(12) United States Patent
Whitty

(10) Patent No.: US 8,175,428 B2
(45) Date of Patent: May 8, 2012

(54) OPTICAL COMMUNICATIONS SYSTEM WITH SELECTIVE BLOCK/ADD CAPABILITY OF AN OPTICAL CHANNEL

(75) Inventor: James R. Whitty, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 767 days.

(21) Appl. No.: 12/080,544

(22) Filed: Apr. 3, 2008

(65) Prior Publication Data

US 2010/0321753 A1   Dec. 23, 2010

Related U.S. Application Data

(63) Continuation of application No. 10/324,925, filed on Dec. 20, 2002, now Pat. No. 7,522,790.

(51) Int. Cl.
   *G02B 6/28* (2006.01)
   *G02B 6/26* (2006.01)
   *G02B 6/42* (2006.01)

(52) U.S. Cl. .............................. 385/24; 385/16; 385/18

(58) Field of Classification Search .................... 385/16, 385/18, 25, 24; 359/872–877
   See application file for complete search history.

(56) References Cited

U.S. PATENT DOCUMENTS

| | | | |
|---|---|---|---|
| 4,244,045 A | 1/1981 | Nosu et al. | |
| 4,482,994 A | 11/1984 | Ishikawa | |
| 5,436,986 A * | 7/1995 | Tsai .............................. | 385/16 |
| 5,488,500 A | 1/1996 | Glance | |
| 5,583,683 A | 12/1996 | Scobey | |
| 5,612,805 A | 3/1997 | Fevrier et al. | |
| 5,717,795 A | 2/1998 | Sharma et al. | |
| 5,771,112 A | 6/1998 | Hamel et al. | |
| 5,859,717 A | 1/1999 | Scobey et al. | |
| 5,867,289 A | 2/1999 | Gerstel et al. | |
| 5,905,827 A | 5/1999 | Naganuma et al. | |
| 5,923,798 A * | 7/1999 | Aksyuk et al. .................. | 385/19 |
| 6,008,920 A | 12/1999 | Hendrix | |
| 6,031,946 A | 2/2000 | Bergmann et al. | |
| 6,094,293 A * | 7/2000 | Yokoyama et al. ........... | 359/280 |
| 6,205,267 B1 * | 3/2001 | Aksyuk et al. .................. | 385/19 |
| 6,289,148 B1 | 9/2001 | Lin et al. | |
| 6,385,364 B1 * | 5/2002 | Abushagur ....................... | 385/16 |
| 6,424,757 B1 | 7/2002 | Sparks et al. | |
| 6,445,846 B2 * | 9/2002 | Lin .................................. | 385/18 |
| 6,493,482 B1 * | 12/2002 | Al-hemyari et al. ............ | 385/19 |
| 6,587,614 B2 * | 7/2003 | Liao et al. ........................ | 385/18 |
| 6,591,031 B2 * | 7/2003 | Wu et al. .......................... | 385/18 |
| 6,597,828 B2 * | 7/2003 | Lee et al. ......................... | 385/18 |

(Continued)

*Primary Examiner* — Daniel Petkovsek
(74) *Attorney, Agent, or Firm* — Christie, Parker & Hale, LLP

(57) ABSTRACT

An optical communications system has a selective block/add capability of an optical channel. An optical beam separator receives and separates an input mixed optical beam into a separated optical channel and a remainder optical beam. A block/add unit receives as an input the separated optical channel and produces as an output a controllably modified separated optical channel. The block/add unit includes a source of an add input optical signal, and a controllable mirror. The controllable mirror is controllable between a first state in which the controllable mirror does not block the path of the separated optical channel, so that the separated optical channel is the output of the block/add unit, and a second state in which the controllable mirror blocks the path of the separated optical channel, and also reflects the add input optical signal as the output of the block/add unit. An optical beam combiner receives the output of the block/add unit and combines the output of the block/add unit with the remainder optical beam.

1 Claim, 2 Drawing Sheets

U.S. PATENT DOCUMENTS

| | | |
|---|---|---|
| 6,625,340 B1 | 9/2003 | Sparks et al. |
| 6,665,462 B2 * | 12/2003 | Wu et al. ............... 385/18 |
| 6,701,036 B2 * | 3/2004 | Castracane ............. 385/18 |
| 6,711,318 B2 * | 3/2004 | Hamerly et al. ........ 385/18 |
| 6,934,432 B1 * | 8/2005 | Rudigier ................. 385/16 |
| 7,522,790 B1 * | 4/2009 | Whitty .................... 385/24 |
| 2001/0002940 A1 * | 6/2001 | Glance .................... 385/18 |
| 2004/0208584 A1 | 10/2004 | Keller |

* cited by examiner

OPTICAL COMMUNICATIONS SYSTEM WITH SELECTIVE BLOCK/ADD CAPABILITY OF AN OPTICAL CHANNEL

REFERENCE TO RELATED APPLICATION

This Application is a Continuation of U.S. patent application Ser. No. 10/324,925, now issued as U.S. Pat. No. 7,522,790, entitled OPTICAL COMMUNICATIONS SYSTEM WITH SELECTIVE BLOCK/ADD CAPABILITY OF AN OPTICAL CHANNEL, filed Dec. 20, 2002, by James Robert Whitty.

BACKGROUND OF THE INVENTION

1. Field of Invention

This invention relates to an optical communication system and, more particularly, to an optical communication system wherein once channel of a mixed optical beam may be selectively passed, or blocked and replaced by another signal.

2. Description of the Related Art

Optical communications systems encode information onto a light beam at a transmitting location, transmit the light beam through free space or a medium such as an optical fiber, and then decode the information from the light beam at a receiving location. A great deal of information may be encoded onto the light beam due to its high frequency. Additional information may be transmitted by encoding the additional information onto a second light beam having a slightly different wavelength than the first light beam, mixing the two light beams together at the transmitting location (or several different transmitting locations), transmitting the mixed light beam, separating the two light beams at the receiving location (or several different receiving locations), and then decoding the two sets of information from the two light beams. The amount of information that may be transmitted is increased yet further by using additional light beams in a similar manner, with all of the light beams at slightly different wavelengths. Each of the individual light beams is termed an "optical channel", so that the mixed light beam may be described as having a number of optical channels.

One form of the optical communications system is a point-to-point system, with a single transmitting location and a single receiving location. A more sophisticated version of the optical communications system includes a number of nodes. Some processing of the mixed light beam may be required at each of nodes. That is, it is ordinarily not the case that there is a single input location for all of the optical channels, and a single output location for all of the optical channels. Nor is it the case that an individual optical channel will always be utilized for a single type of information. For example, individual optical channels may be tapped or extracted from the mixed optical beam at one of the nodes, and/or new information may be added to an individual optical channel to replace that being carried on the optical channel up to that point.

Hardware in the form of light-beam processing equipment is required to implement these operations at the nodes. The hardware must be effective to accomplish the required manipulation of the optical beam and should desirably require minimal human technician support at the point of implementation. The present invention fulfills this need for a specific type of nodal function, and further provides related advantages.

SUMMARY OF THE INVENTION

The present invention provides an optical communications system with a selective block/add capability of an optical channel. This feature is usefully employed at nodes in the optical communications system, whereat information on a selected optical channel is to be selectively transmitted through the node or the information is to be blocked and replaced with other information. The present approach is desirably implemented with remote control capability, so that the block/add function may be selectively controlled without the need for human support at the side of the node.

In accordance with the invention, an optical communications system with selective block/add capability of an optical channel is operable with an input mixed optical beam. The optical communications system comprises an optical beam separator that receives and separates the input mixed optical beam into a separated optical channel and a remainder optical beam, and a block/add unit that receives as an input the separated optical channel and produces as an output a controllably modified separated optical channel. The controllably modified separated optical channel is selectable between the separated optical channel and an add input optical signal. An optical beam combiner receives the output of the block/add unit and combines the output of the block/add unit with the remainder optical beam.

The block/add unit preferably comprises a source of an add input optical signal, and a controllable mirror. The controllable mirror is controllable between a first state in which the controllable mirror does not block the path of the separated optical channel, so that the separated optical channel is the output of the block/add unit, and a second state in which the controllable mirror blocks the path of the separated optical channel, and also reflects the add input optical signal as the output of the block/add unit.

Even more preferably, the block/add unit comprises a block/add unit input collimator that transmits the separated optical channel into a free space, a block/add unit output collimator positioned to receive the transmitted separated optical channel from the block/add unit input collimator and having as an output the controllably modified separated optical channel, a block/add unit add collimator having as an output into the free space an add input optical signal, and a controllable mirror positioned in the free space between the block/add unit input collimator and the block/add unit output collimator. The controllable mirror is controllable between a first state in which the controllable mirror does not block the path of the separated optical channel between the block/add unit input collimator and the block/add unit output collimator, so that the separated optical channel propagates unmodified through the free space from the block/add unit input collimator to the block/add unit output collimator, and a second state in which the controllable mirror blocks the path of the separated optical channel between the block/add unit input collimator and the block/add unit output collimator, and also reflects the add input optical signal from the block/add unit add collimator to the block/add unit output collimator.

The optical beam separator may comprise an optical beam demultiplexer. The controllable mirror may comprise a reflective surface, and a mirror drive operable to move the reflective surface between the first state and the second state. The optical beam combiner may comprise an optical beam multiplexer.

Although the prior discussion has addressed the approach of the invention in relation to a single channel, the present approach is equally applicable to implementing the block/add function for multiple channels of the mixed optical beam or for all channels of the mixed optical beam.

The present approach provides a reliable, readily controlled approach for performing the block/add function at a node or other location of an optical communications system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
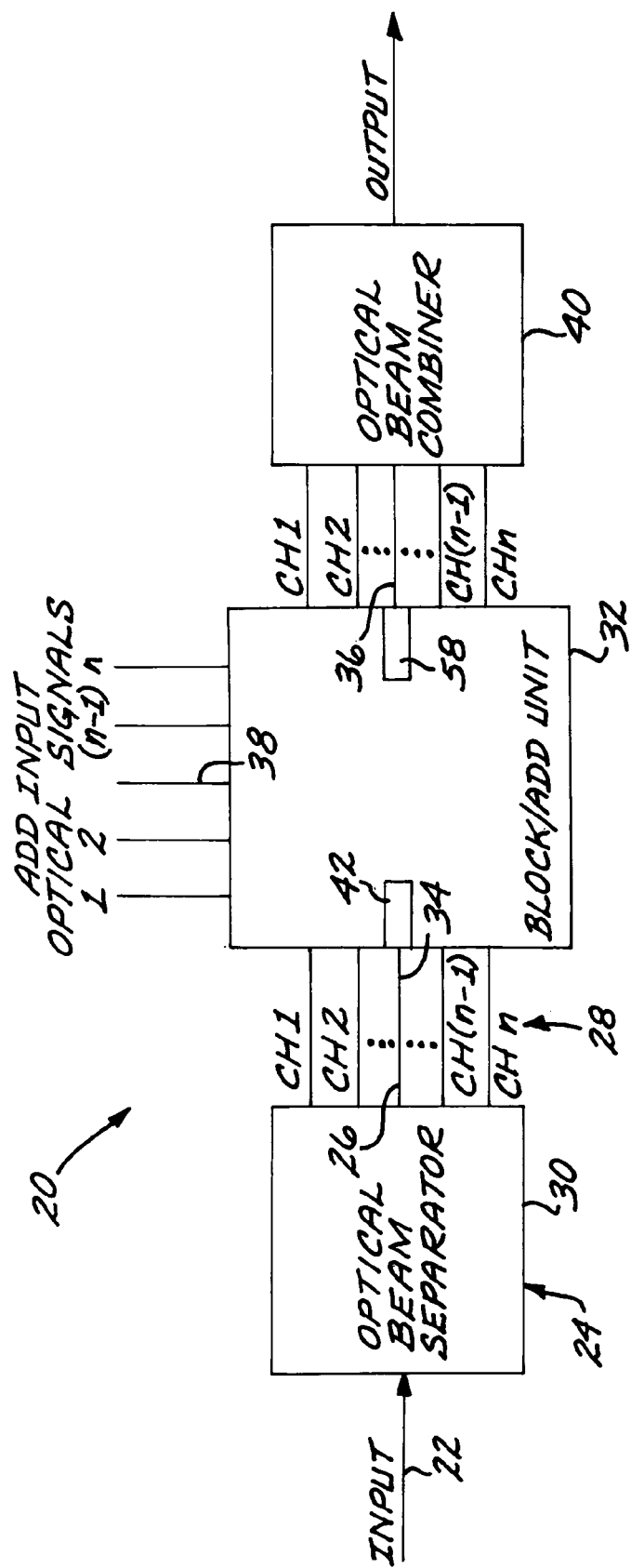
FIG. 1 is a schematic diagram of an optical communications system.

FIG. 1 depicts an optical communications system 20 with selective block/add capability of an optical channel. The optical communications system 20 is operable with an input mixed optical beam 22. The optical communications system 20 includes an optical beam separator 24 that receives and separates the input mixed optical beam 22 into a separated optical channel 26 and a remainder optical beam 28. In one embodiment, the optical beam separator 24 is a demultiplexer 30 that separates the input mixed optical beam 22 into a plurality of individual channels 1 . . . n, and the separated optical channel 26 is any of those n individual channels. Demultiplexers are known in the art, see for example U.S. Pat. Nos. 4,244,045; 4,482,994; 5,583,683; 5,859,717; 5,905,827; and 6,008,920, whose disclosures are incorporated by reference.

A block/add unit 32 receives as an input 34 the separated optical channel 26 and produces as an output 36 a controllably modified separated optical channel. The controllably modified separated optical channel that is the output 36 of the block/add unit 32 is selectable between the separated optical channel 26 and an add input optical signal 38.

An optical beam combiner 40 receives the output 36 of the block/add unit 32 and combines the output 36 of the block/add unit 32 with the remainder optical beam 28. In one embodiment, the optical beam combiner 40 is a multiplexer 42 that combines the output 36 of the block/add unit 32 with the remainder optical beam 28. Multiplexers are known in the art, see for example U.S. Pat. Nos. 4,244,045; 4,482,994; 5,583,683; 5,859,717; 5,905,827; and 6,008,920.

Figure 2:
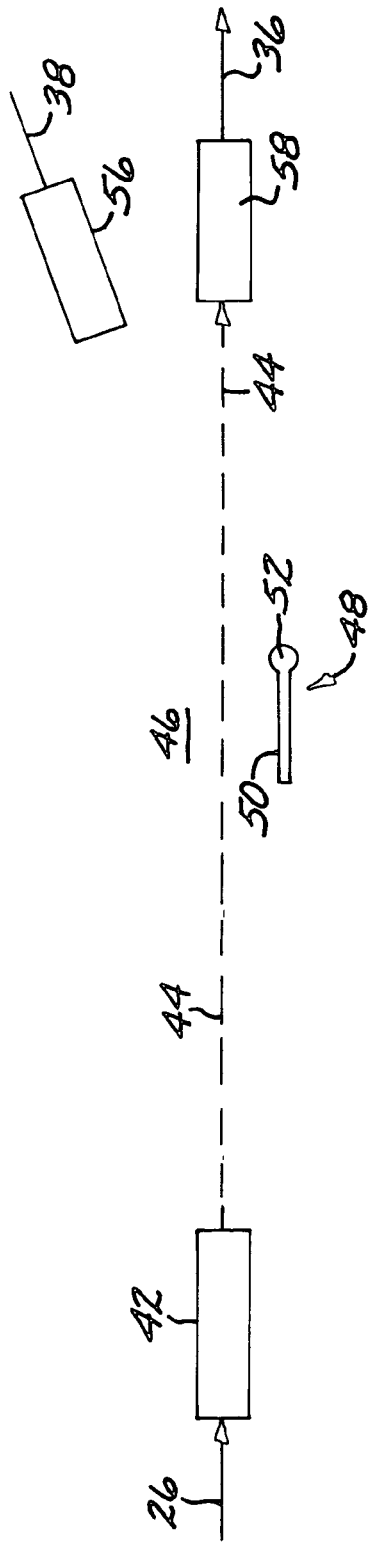
FIG. 2 is a schematic diagram of the block/add unit in its first, unblocked state.
Figure 3:
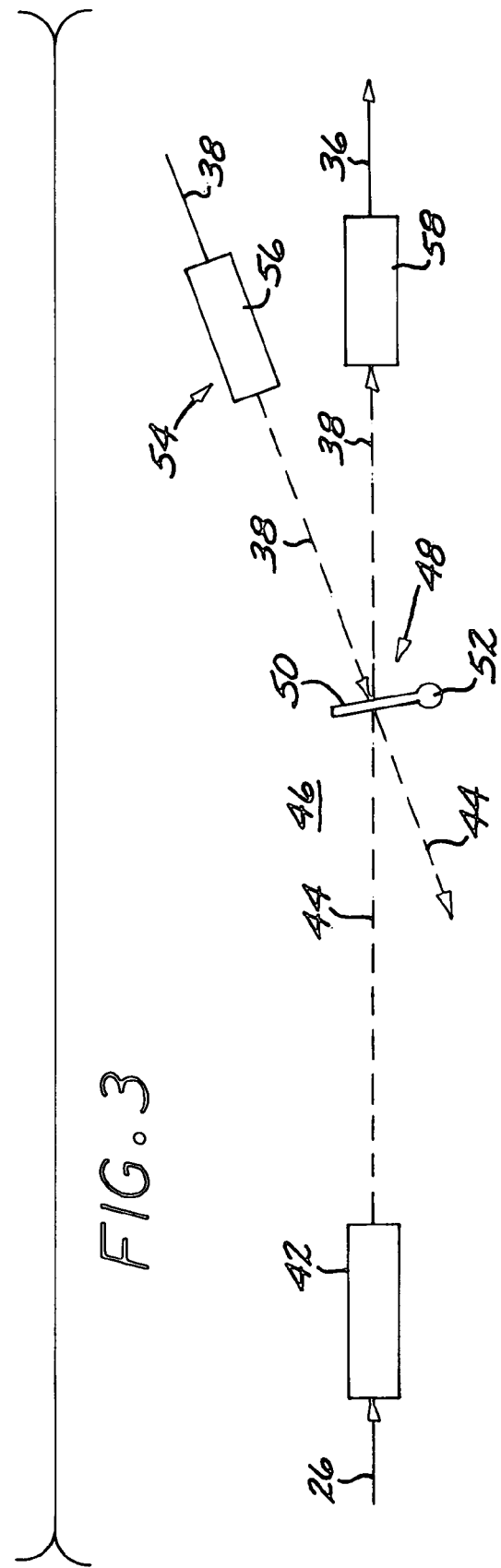
FIG. 3 is a schematic diagram of the block/add unit in its second, blocked-and-add state.

FIGS. 2-3 schematically depict the block/add unit 32 in greater detail. A block/add unit input collimator 42 receives the separated optical channel 26 and transmits the separated optical channel 26 along a beam path 44 into a free space 46. The block/add unit 32 preferably further includes a controllable mirror 48 located in the free space 46. The controllable mirror 48 may be of any operable type. In the illustrated presently preferred embodiment, the controllable mirror 48 in turn comprises a reflective surface 50 and a mirror drive 52. The mirror drive 52 is preferably an electromechanical drive, but it may be of any controllable type. The mirror drive 52 is preferably remote controllable, so that the functioning of the block-add unit 32 may be controlled remotely and without an operator present at the site of the block-add unit 32. The mirror drive 52 is controllably operable to move the reflective surface 50 between a first state or position, shown in FIG. 2, in which the controllable mirror 48 does not block the beam path 44 of the separated optical channel 26, so that the separated optical channel is the output 36 of the block/add unit 32; and a second state or position, shown in FIG. 3, in which the controllable mirror 48 blocks the beam path 44 of the separated optical channel 26.

When the controllable mirror 48 is in the second state that blocks the beam path 44 of the separated optical channel 26, it also reflects the add input optical signal 38 provided from a source 54 of the add input optical signal 38. The source 54 of the add input optical signal 38 is preferably a block/add unit add collimator 56 that directs the add input optical signal 38 into the free space 46 to reflect from the reflective surface 50. When the controllable mirror 48 is in the second state, the reflected beam 44 may be received and used, or it may be discarded.

When the controllable mirror 48 is in the first state shown in FIG. 2, the beam path 44 of the separated optical channel 26 is received by a block/add unit output collimator 58 that is positioned to receive the output 36 of the block/add unit 32 from the controllable mirror 48, and thence becomes the output 36 of the block/add unit 32. That is, when the controllable mirror 48 is in the first state, the separated optical channel 26 propagates unmodified through the free space 46 from the block/add unit input collimator 42 to the block/add unit output collimator 58, to serve as the output 36 of the block-add unit 32. When the controllable mirror 48 is in the second state shown in FIG. 3, the add input optical signal 38 is reflected from the reflective surface 50 and into the block/add unit output collimator 58, to serve as the output 36 of the block/add unit 32.

Thus, the output 36 of the block/add unit 32 that is combined with the remainder optical beam 28 in the optical beam combiner 40 is either the separated optical channel 26 (when the controllable mirror 48 is in the first state) or the add input optical channel 38 (when the controllable mirror 48 is in the second state).

The operation of the optical communications system 20 has been described in terms of block/add function applied to a single one of the n channels. Its use may be extended to an additional one or more of the n channels, either by providing the appropriate number of block/add units 32 or by an approach where one block/add unit performs the block/add function for multiple ones of the separated channels 26.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical communications system operable with a mixed input signal comprising:
   an optical beam separator having means for separating said mixed input optical beam into a separated optical channel and a remainder beam;
   a block add unit optically coupled to said separator to receive said separated optical channel and producing as an output a controllably modified separated optical channel in response thereto or an added input optical signal, said block add unit including at least one switch unit comprising:
      a planar surface disposed to allow light from a first source to illuminate a first detector in a first position thereof, said planar surface being mounted for rotation about an axis along an edge of said planar surface thereof from said first position, at which light from said first source is unimpeded, to a second position, at which said light is blocked by said planar surface, at least one side of said planar surface being reflective and effective to block light from a first source with respect to a first detector in said second position and reflect light from a second source to said detector in said second position and means for selectively actuating said surface between said first and second positions; and an optical beam combiner coupled to receive said controllably modified separated optical channel or said added input optical channel from said block add unit and combine said remainder beam therewith as an output beam.

* * * * *